Figure 1:
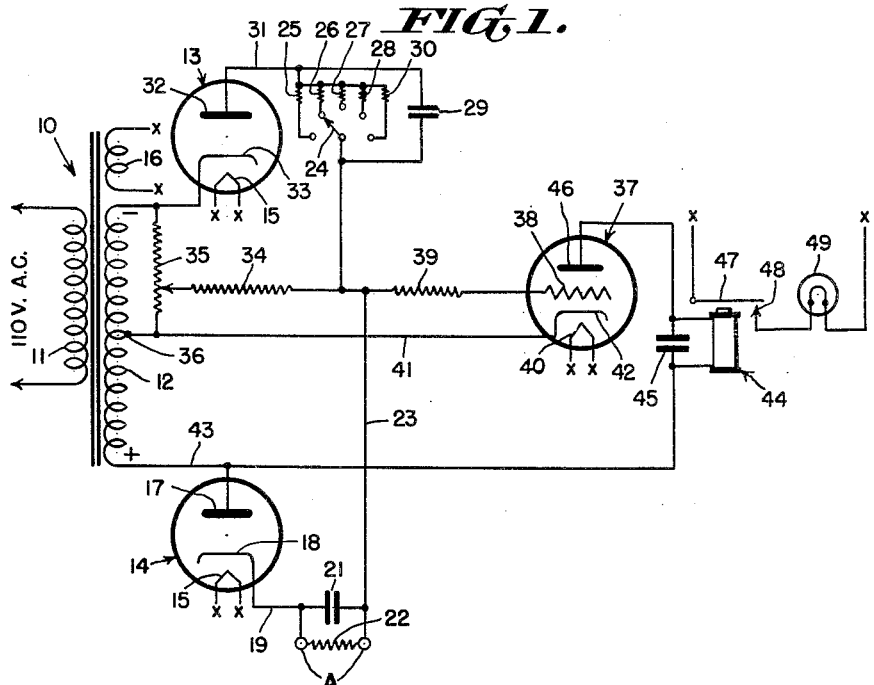

Inventors
E. H. Beach
M. T. Weiss

Patented Jan. 2, 1951

2,536,022

UNITED STATES PATENT OFFICE 2,536,022

RESISTANCE TESTING DEVICE

Eugene H. Beach, Highland, Mich., and
Max T. Weiss, New York, N. Y.

Application July 17, 1947, Serial No. 761,655

9 Claims. (Cl. 175—183)

(Granted under the act of March 3, 1883, as
amended April 30, 1928; 370 O. G. 757)

This invention relates generally to electrical testing devices and more particularly to an electronic resistance testing device employing a lamp for indicating the suitability for the purpose of electrical apparatus such as is employed, for example, in the arming and firing circuits of mines and depth charges.

In certain mine firing mechanisms employing sensitive relays adapted to be actuated by currents in the order of 10 microamperes, for example, it is necessary that the leakage resistance at critical points in the mechanisms be sufficient to prevent actuation of the relays by reason of the current flow through various leakage paths of the mechanisms. It is also necessary in certain firing mechanisms that the resistance of various conductors be a minimum in order to prevent voltage drops therein which would lower the potential of the battery supply for the mechanisms below the operating voltage of certain of the relays employed therein.

According to the arrangement of the present invention, the suitability of the resistance of the object under test is measured by an electronic circuit in which the difference in resistance between that of the object under test and a reference or standard resistor having a value corresponding to the acceptable value of resistance is utilized in producing a bias voltage for controlling the current through an electron discharge device and a relay connected in series therewith, whereby the relay is energized or deenergized sufficiently to close or open, as the case may be, a circuit to an indicating lamp. The bias voltage thus produced is proportional to the deviation in resistance of the object under test from the acceptable value, and means is provided for regulating the initial bias on the electron discharge device so as to cause the lamp to light or extinguish, as the case may be, in accordance with a deviation in resistance indicating rejectable apparatus.

The bias voltage for the electron discharge device and the other operating voltages therefor are obtained directly from a conventional A. C. source and therefore obviate the need for supply batteries or a power supply including the rectifiers and associated filters usually employed to obtain a direct current or B supply from the A. C. source. This arrangement renders the testing device of the present invention susceptible of portable design and particularly well suited for use in the production testing of mines and like apparatus. Moreover, in use, a minimum of effort and skill is required on the part of the operator in determining the acceptability of the object under test, this being readily indicated by the lamp at a glance, and the operator may pass on to the next object to be tested without delay, and the testing device may be transferred rapidly to successive objects as by an automatically operated stepper switch, thus avoiding time-consuming and fatiguing operations otherwise encountered, for example, in the use of a resistance meter having an indicating pointer and associated scale.

An object of the present invention, therefore, is to provide a new and improved device for indicating the suitability for the purpose of the resistance in various electrical apparatus.

Another object is to provide an electrical testing device of the aforedescribed character adapted to indicate the suitability for the purpose of resistance in electrical apparatus without the need for an indicating meter.

Another object is to provide a new and improved resistance testing device which may be operated from a conventional A. C. line without the need for a battery or other D. C. source of supply.

A further object is to provide a new and improved resistance testing device in which a voltage proportional to the difference between a reference resistance and a resistance under test is utilized to cause the lighting or exinguishing of a lamp, thereby to indicate the suitability for the purpose of the resistance under test.

A further object is to provide a new and improved electronic resistance testing device in which the difference in resistance between a reference and unknown resistance is utilized to produce a voltage for controlling the current flow through an electron discharge device which, in turn, is employed to control the lighting or extinguishing of an indicating lamp.

Figure 2:
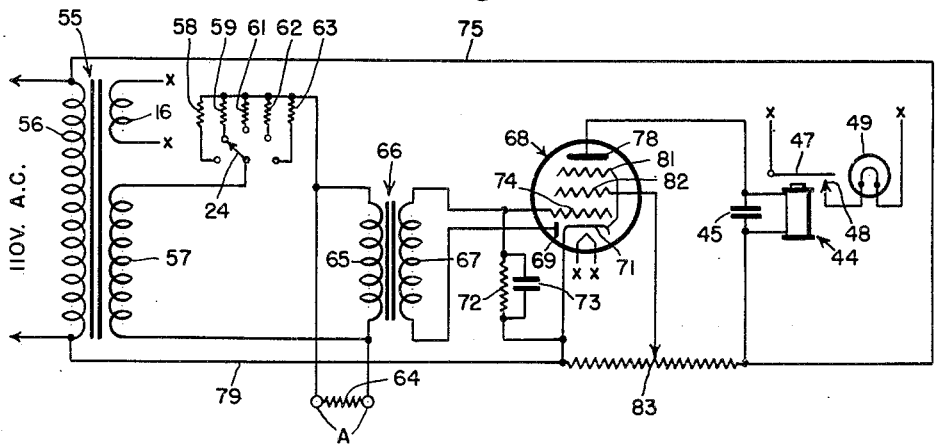

Still other objects, features and advantages of the present invention are those implied from or inherent in the novel combination and arrangement of parts as will become more clearly apparent from the following detailed description taken with reference to the accompanying drawings wherein:

Fig. 1 is a diagrammatic view of one form of the invention particularly adapted to measure the resistance of electrical apparatus having a relatively high order of resistance and to indicate such resistance as being above or below an acceptable value; and Fig. 2 is a diagrammatic view of an alternate form of the invention particularly adapted to measure the resistance of electrical apparatus having a relatively low order of resistance and to indicate such resistance as being above or below an acceptable value.

Referring now to the drawings for a more complete understanding of the invention and more particularly to Fig. 1 thereof, there is shown thereon a transformer indicated generally by the numeral 10 and having a primary winding 11 adapted to be connected to a conventional source of A. C. power.

Voltage appearing in secondary winding 12 of the transformer is rectified by a pair of conventional heater type diode vacuum tubes 13 and 14 connected in series thereacross, the heaters 15 of the diodes being connected in any conventional manner to secondary winding 16 of the transformer as by interconnecting the common terminals X—X. The A. C. current from the transformer is preferably rectified to obtain a pulsating current, thereby to reduce the reactive voltage component in the voltage divider network, hereinafter to be described, due to the reactive impedance of the apparatus to be tested therein. Both diodes may be dispensed with, however, when the resistive impedance of the apparatus under test is in the order of 10 times the magnitude of the capacitive impedance of the apparatus.

The rectified pulsating current flows from winding 12 by way of conductor 43, plate 17 and cathode 18 of diode 14, conductor 19, condenser 21 in parallel with the unknown resistance 22 connected between test terminals A—A, conductor 23, selector switch 24 and resistor 26, for example, in parallel with condenser 29, conductor 31, and thence by way of plate 32 and cathode 33 of diode 13 to the other side of winding 12.

Resistors 25, 26, 27, 28, and 30 have values corresponding to the values desired for the unknown resistances to be connected between terminals A—A, the positions of selector switch 24 preferably being appropriately marked to indicate the desired values. Thus, resistor 26, for example, has a value corresponding to the value desired for unknown resistance 22. When the resistance value of resistor 22 is less than the value desired therefor, current in conductor 23 also flows in part to winding 12 by way of resistor 34 and potentiometer 35 which is connected between the center tap 36 of winding 12 and the end thereof connected to cathode 33. When the resistance value of resistor 22 exceeds the value desired therefor, current flows through resistor 34 from winding 12 by way of potentiometer 35, the wiper thereof, resistor 34, selector switch 24, resistance 26, conductor 31, and thence by way of diode 14 back to winding 12.

From the foregoing it will be apparent that unknown resistance 22 and known resistance 26 provide a voltage divider network across winding 12 such that the polarity and value of the voltage developed across resistor 34 is controlled by the division of voltage effected in accordance with the relative values of resistances 22 and 26. Thus, differences in the values of the known and unknown resistances may be utilized in developing voltages across resistance 34 of variable magnitude in accordance with deviations of the actual values of unknown resistances from the values respectively desired therefor and of either polarity controlled by the greater or lesser magnitude of the actual values of the unknown resistances with respect to the values desired therefor.

The pulsating current through this voltage divider network produces unequal reactive voltage components therein for the reason that the external leads of the apparatus under test, in most cases, are longer than the internal leads to the reference resistors 25, 26, 27, 28, and 30 and, accordingly, produce greater capacitive impedance effects in the voltage divider network. Condensers 21 and 29, which preferably are of equal capacitance and of considerably greater value that the aforementioned capacitive impedance effects, serve to substantially nullify inequalities therein such that only a negligible uncompensated voltage division is produced thereby in the voltage divider network whereby the testing device is adapted to provide accurate measurements of unknown resistances in the order of 50 megohms. Condensers 21 and 29, however, are of sufficiently small capacitive value to permit rapid changes in the voltage division in the voltage divider network whereby the testing device may be rapidly operated automatically.

Resistance 34 and potentiometer 35 are connected in the grid circuit of a conventional vacuum tube control triode 37. The potentials developed across resistor 34 and potentiometer 35 thus control the current flow through the main discharge path of the triode, the grid circuit thereof being traced from grid 38, a protective resistance 39, resistance 34, potentiometer 35 in parallel with the upper half of secondary winding 12, and thence by way of conductor 41 to the cathode 42 of the triode. The protective resistance 39 is preferably of sufficiently large value to prevent substantially all current flow in the grid path of triode 37 when the resistance between terminals A—A is such a small value as to drive the grid positively in excess of the negative potential from potentiometer 35 during alternate half cycles of the potential of winding 12 in which positive potential is applied to the plate of triode 37.

Current in the main discharge path of triode 37 is supplied from winding 12 during alternate half cycles of the potential thereof having the polarity indicated in Fig. 1, the circuit for this purpose being traced from winding 12 by way of conductor 43, winding of relay 44 in parallel with condenser 45 adapted to prevent chattering of the relay during non-conducting half cycles of triode 37, plate 46 and cathode 42 of triode 37, and thence by way of conductor 41 to center tap 36 of winding 12.

Potentiometer 35 serves as a source of negative bias for triode 37 when the potential at winding 12 is of such polarity as to render the triode conducting, and the potentiometer may be adjusted to fix the operating point of relay 44 over a wide range of bias values of the triode.

From the foregoing, it will be apparent that, although the grid of triode 37 is positively biased during alternate half cycles when diodes 13 and 14 are not conducting, the plate of triode 37 is negative with respect to the cathode thereof during these half cycles, and hence, the main discharge path of the triode is non-conductive during such intervals.

The heater 40 of the triode preferably is connected to secondary winding 16 of transformer 10, as in the case of diodes 13 and 14.

Relay 44 comprises an armature 47 and make contact 48 which are closed as the relay operates to complete an obvious series circuit to an indicating lamp 49 from secondary winding 16 of transformer 10, the common terminals X—X being connected as in the case of the heaters of triode 37 and diodes 13 and 14.

In the use of the device of Fig. 1 in testing the resistance of certain apparatus which is acceptable if the resistance thereof equals or exceeds a minimum acceptable value, selector switch 24 is adjusted to the resistor 25, 26, 27 or 28 having a value corresponding to the minimum acceptable resistance, a known resistance having a value equal to the minimum acceptable value is connected between terminals A—A, and potentiometer 35 thereafter is adjusted until the current flow through triode 37 is just below the operating current for relay 44 such that the relay is not operated and lamp 49 is extinguished, and remains extinguished, until the bias on the triode is increased positively.

After the desired operating point of the triode is set, the known resistance is removed from terminals A—A and the apparatus under test is connected therebetween, this apparatus, for example, being a mine firing mechanism having various leakage paths.

When the resistance of the apparatus under test is either equal to or greater than the minimum acceptable value therefor, the indicating lamp does not light, thus indicating that the apparatus is acceptable. This follows from the fact that the potential at conductor 23 is either equal to or less than the potential thereon when the known value of resistance was connected between terminals A—A whereby the potential across resistor 34 either remains at the same value or increases in a direction to increase negatively the bias on triode 37, whereupon insufficient current flows therethrough to operate relay 44.

When the resistance of the apparatus under test is less than the minimum acceptable value, the potential at conductor 23 increases such that the voltage across resistor 34 either decreases in value negatively or changes in polarity such that the bias on triode 37 is increased positively sufficiently to increase the current therethrough above the operating value of relay 44 whereby the relay is operated to light lamp 49 and thus indicate that the apparatus under test should be rejected.

In testing the resistance of apparatus which is acceptable if the resistance thereof is equal to or less than a maximum acceptable value, the selector switch is adjusted to a resistance having a value corresponding to the maximum acceptable value, a known resisance of this value is connected between terminals A—A, and potentiometer 35 is adjusted to cause a current flow through the triode just sufficient to operate relay 44 and light lamp 49. Thereafter, the known resistance is removed from the test terminals and the apparatus under test is connected therebetween.

When the resistance of the apparatus under test is equal to or less than the maximum acceptable value, the lamp does not extinguish, thereby indicating the acceptability of the apparatus. This follows from the fact that the potential across resistor 34 either remains the same or increases positively such that the current flow through the triode is increased whereby the lamp remains lighted.

When the resistance of the apparatus under test is greater than the maximum acceptable value, the lamp is extinguished, thereby indicating that the apparatus should be rejected. This follows from the fact that the potential across resistor 34 either decreases positively or changes polarity and increases negatively such that the current flow through the triode decreases below the operating value of relay 44 whereby the circuit controlled thereby opens to extinguish the lamp.

It will be apparent from the foregoing that apparatus may also be tested which is acceptable when the resistance thereof falls within limits of a nominal value such, for example, as 50 megohms ±10%. In this case, the apparatus is tested, as in the foregoing, for acceptability regarding its minimum acceptable value (45 megohms) and thereafter is tested for acceptability regarding its maximum acceptable value (55 megohms).

It will also be apparent that selector switch 24 may be ganged with the wiper of potentiometer 35 so that the potentiometer is moved to the position corresponding to the seletced position of the selector switch as the selector switch is moved to such position, thereby obviating the step of connecting a known resistance between terminals A—A prior to connecting the apparatus under test therebetween. Also, it will be understood that the positions of the wiper of the potentiometer corresponding to the positions of the selector switch may be predetermined and indicated whereby the potentiometer wiper may be set without connecting a known resistance between terminals A—A.

Referring now to Fig. 2, a circuit is shown thereon generally similar to the circuit of Fig. 1. Accordingly, the same reference characters are employed to designate like parts in the circuits. The circuit of Fig. 2, however, is particularly adapted for use in testing electrical apparatus having a low order of resistance.

The numeral 55 generally designates a step down transformer having a primary winding 56 which is adapted to be supplied from a conventional source of A. C. power. The low voltage secondary winding 57 of the transformer supplies a voltage divider network connected thereacross and comprising the selected one of known resistances 58, 59, 61, 62, and 63 and the resistance under test 64 connected between the test terminals A—A, the circuit for this purpose being traced as follows from winding 57, selector switch 24, resistance 59, and thence by way of resistance 64 in parallel with the primary winding 65 of a step up coupling transformer 66 to the other side of winding 57.

The voltage at primary winding 65 follows the voltage across resistance 64 whose potential in turn is controlled by the division of voltage effected by the relative values of resistances 59 and 64. The voltage appearing in secondary winding 67 of coupling transformer 66 is rectified in the diode section of a conventional heater type diode-triode vacuum tube 68, the circuit for this purpose being traced from secondary winding 67, plate 69 and cathode 71 of tube 68, and thence by way of resistor 72 in parallel with condenser 73 to the other side of winding 67.

The control grid 74 of tube 68 is connected to the junction of condenser 73 and winding 67. Thus, the rectified current through the diode section of the tube charges condenser 73 in a direction to bias the control grid negatively with respect to the cathode of the tube, thereby to control the flow of current through the main electron discharge path thereof. Resistor 72 provides a discharge path for condenser 73 whereby a substantially constant potential is maintained on the control grid and the potential thereon is caused to follow changes in potential across primary winding 65.

Current through the main discharge path of tube 68 is supplied from primary winding 56, the circuit for this purpose being traced from the winding by way of conductor 75, winding of relay 44 in parallel with condenser 45, plate 78 and cathode 71 of tube 68, and thence by way of conductor 79 to the other side of winding 56. The suppressor grid 81 is connected to the cathode of tube 68 according to conventional practice, and the current flow through the tube for a given bias potential on the control grid is regulated by varying the potential on the screen grid 82 of the tube. This is accomplished by connecting the screen grid to the wiper of a potentiometer 83 which is connected between conductors 75 and 79 across primary winding 56.

As in the case of Fig. 1, relay 44 when operated, completes a circuit for lighting lamp 49, this circuit being connected to secondary winding 16 of transformer 56 at their common terminals X—X. The heater of tube 68 is also preferably energized from winding 16 by connection therewith at terminals X—X.

In the use of the device of Fig. 2 in testing apparatus which is acceptable when the resistance thereof is equal to or less than a maximum acceptable value, selector switch 24 is adjusted to the particular one of resistances 58, 59, 61, 62 and 63 having a value corresponding to the maximum acceptable value, a known resistor of the same value is connected between terminals A—A, and potentiometer 83 is adjusted until the current flow through tube 68 is just sufficient to operate relay 44 thereby to light lamp 49.

The known resistance is now removed and the apparatus to be tested is connected between terminals A—A, this apparatus, for example, being the supply cables between a battery and a firing mechanism of a mine. When the resistance of the apparatus under test is equal to or less than the maximum acceptable value, the lamp does not extinguish, thereby indicating that the apparatus is acceptable. This follows from the fact that the voltage across winding 65 either remains the same or decreases in accordance with the difference in the actual resistance of the apparatus and the acceptable maximum resistance thereof. When the resistance is less than the acceptable maximum resistance, the voltage across winding 65 decreases whereupon the charge on condenser 73 decreases. This reduces the negative bias on the control grid of tube 68 whereby the current through the main discharge path of the tube, and therefore through relay 44, is increased, thus maintaining the energizing circuit to lamp 49.

When the resistance of the apparatus is greater than the maximum acceptable value, the lamp is extinguished, thus indicating that the apparatus should be rejected. This follows from the fact that the voltage across winding 65 is increased, thereby increasing the charge on condenser 73. This increases the negative bias on tube 68 whereupon the current flow therethrough is decreased below the operating value of relay 44 such that the relay armature is released, thereby to open the circuit to the lamp and extinguish it.

In testing apparatus which is acceptable when the resistance thereof is equal to or greater than a minimum acceptable value, potentiometer 83 is adjusted, with values of resistance at the selector switch and at terminals A—A equal to the minimum acceptable value, until the current flow through tube 68 is just below the operating value of relay 44, and thereafter the known resistance is removed from terminals A—A and the apparatus to be tested is connected therebetween.

When the resistance of the apparatus under test is equal to or greater than the minimum acceptable resistance, the lamp does not light thereby indicating that the apparatus is acceptable, it being understood that when the resistance is greater than the minimum acceptable resistance, the negative bias on tube 68 is increased, thereby further insuring that the relay will not be operated.

When the resistance of the apparatus is less than the minimum acceptable value, the lamp is lighted, thereby indicating that the apparatus should be rejected. This follows from the fact that the potential across winding 65 and, therefore the bias on tube 68, is decreased whereupon the current through the tube becomes sufficient to operate relay 44 and light the lamp.

It will be understood that, as in the case of Fig. 1, apparatus may also be tested which is acceptable when the resistance thereof falls within certain limits of a nominal value such, for example, as 1 ohm ±10%. In this case, the apparatus is tested for acceptability regarding its maximum acceptable value (1.1 ohms) and thereafter is tested for acceptability regarding its minimum acceptable value (.9 ohm).

It will further be understood that, as in the case of Fig. 1, selector switch 24 may be ganged with the wiper of potentiometer 83 whereby the potentiometer is moved to an adjustment therefor corresponding to a selected position of the selector switch concurrently with the movement of the selector switch to such position, or the various positions of the potentiometer may be indicated thereon, thus obviating the step of connecting the known resistance between terminals A—A.

From the foregoing, it should now be apparent that a resistance testing device has been provided which is well adapted to fulfill the aforestated objects of the invention. Moreover, while the invention has been described in particularity with reference to certain examples thereof which give satisfactory results, it will be apparent to those skilled in the art, after understanding the invention, that the same is susceptible of additional examples and modifications thereof without departing from the spirit and scope of the invention ase defined by the appended claims.

The invention herein described and claimed may be manufactured and used by or for the Government of the United States of America for governmental purposes without the payment of any royalties thereon or therefor.

What is claimed as new and desired to be secured by Letters Patent of the United States is:

1. A resistance testing device of the character disclosed comprising, in combination, a known resistance having a value corresponding to the resistance value desired in the apparatus to be tested, a voltage divider network including said apparatus and said known resistance in series with said apparatus, a relay, a circuit for energizing the relay, a lamp, a circuit including said lamp and controlled by the relay for energizing the lamp when the current flow to the relay equals or exceeds the minimum operating current thereof, an electron discharge device having the main discharge path thereof in said relay energizing circuit and having a grid for controlling the current flow through said discharge path, variable resistance means adjustable at will and operatively connected to said discharge device for initially adjusting the bias thereof to a value effective to adjust the initial current flow to the relay to a predetermined amount above or below the said minimum operating current in accordance with the permissible deviation of the resistance value of the apparatus from the desired value, and means including said voltage divider network for applying a bias voltage to said grid proportional to the difference in the resistance values of the known resistance and the apparatus whereby the lamp is lighted or extinguished in accordance with the setting of said adjustable means when said difference in resistance values exceeds said permissible deviation.

2. A resistance testing device of the character disclosed comprising, in combination, a known resistance having a value corresponding to the resistance value desired in the apparatus to be tested, a voltage divider network including said apparatus and said known resistance in series with said apparatus, a relay, a circuit for energizing the relay, a lamp, a circuit including said lamp and controlled by the relay for energizing the lamp as the relay operates, an electron discharge device having the main discharge path thereof in said relay energizing circuit and having a grid for controlling the current flow through said discharge path, variable resistance means adjustable at will and operatively connected to said discharge device for initially adjusting the bias thereof to a value effective to adjust the initial current flow to the relay to a predetermined value below the minimum operating current thereof in accordance with the permissible deviation of the resistance value of the apparatus from the desired value, and means including said voltage divider network for applying a bias voltage to said grid proportional to the difference in the resistance values of the known resistance and the apparatus whereby the relay is operated to light the lamp when said difference in resistance values exceeds said permissible deviation.

3. A resistance testing device of the character disclosed comprising, in combination, a known resistance having a value corresponding to the resistance value desired in the apparatus to be tested, a voltage divider network including said apparatus and said known resistance in series with said apparatus, a relay, a circuit for energizing the relay, a lamp, a circuit including said lamp and controlled by the relay for energizing the lamp when the relay is operated, an electron discharge device having the main discharge path thereof in said relay energizing circuit and having a grid for controlling the current flow through said discharge path, variable resistance means adjustable at will and operatively connected to said discharge device for initially adjusting the bias thereof to a value effective to adjust the initial current flow to the relay to a predetermined value above the minimum operating current thereof in accordance with the permissible deviation of the resistance value of the apparatus from the desired value, and means including said voltage divider network for applying a bias voltage to said grid proportional to the difference in the resistance values of the known resistance and the apparatus whereby the current flow to the relay is reduced below said minimum operating current to extinguish the lamp when said difference in resistance values exceeds said permissible deviation.

4. A resistance testing device of the character disclosed comprising, in combination, a plurality of known resistances, a selector switch connected to said resistances, a voltage divider network including in series connection therein said selector switch and the apparatus to be tested and one of said known resistors selectively in accordance with the setting of the selector switch, said one of the known resistances having a value corresponding to the resistance value desired in said apparatus, a relay, a circuit for energizing the relay, a lamp, a circuit including said lamp and controlled by the relay for lighting the lamp when the relay is operated, an electron discharge device having the main discharge path thereof in said relay energizing circuit and having a grid for controlling the current flow through said discharge path, variable resistance means adjustable at will and operatively connected to said discharge device for initially adjusting the bias thereof to a value effective to adjust the initial current flow to the relay to a value which differs from the minimum operating current of the relay in an amount proportional to the permissible deviation of the resistance value of the apparatus from the desired value, means for energizing said voltage divider network from a conventional A. C. source of power, and means including the voltage divider network for applying a bias voltage to said grid proportional to the difference in the resistance values of said one of the known resistances and the apparatus whereby the luminous condition of the lamp is changed when said difference in resistance values exceeds said permissible deviation.

5. A resistance testing device of the character disclosed comprising, in combination, a known resistance having a value corresponding to the resistance value desired in the apparatus to be tested, circuit means including the apparatus and the known resistance series connected therein for generating from a conventional A. C. source a voltage proportional to the difference in the resistance values of the apparatus and resistance, an electron discharge device having a control grid, means including a rectifier for applying to said grid a D. C. voltage corresponding to the peak value of the generated voltage, a lamp, and circuit means including said lamp and the electron discharge device and responsive to current flow through the discharge device due to said D. C. voltage for causing a change in the luminous condition of the lamp when said difference in resistance values exceeds a permissible deviation in the resistance value of the apparatus from the value desired therefor.

6. A resistance testing device of the character disclosed comprising, in combination, a lamp, a relay, a circuit including said lamp and controlled by the relay for lighting the lamp when the relay is energized by a current which equals or exceeds the minimum operating current thereof, an electron discharge device having a control grid, a circuit including the discharge device and the relay for varying the energization of the relay in accordance with variations in the bias voltage applied to said grid, a resistance having a value corresponding to the resistance value desired in the apparatus to be tested, a circuit including said apparatus and said resistance in series with said apparatus for generating and applying to the grid a bias voltage proportional to the difference in the resistance value of the apparatus and the value desired therefor, and variable resistance means adjustable at will and operatively connected to said discharge device for initially adjusting the bias thereof to a value effective to initially adjust the relay current to a predetermined value thereby to cause a change in the luminous condition of the lamp when said difference in resistance exceeds a predetermined value and the bias voltage has changed in value in a direction adapted to change the relay current away from said predetermined value thereof and in the direction of said minimum operating current.

7. A resistance testing device of the character disclosed comprising, in combination, a known resistance having a value corresponding to the resistance value desired for the apparatus to be tested, circuit means adapted to be energized from a conventional A. C. source for connecting said known resistance and said apparatus in series to form a voltage divider network, said circuit means having at least one rectifier in series with said voltage divider network for reducing reactive impedance effects therein and having condenser means shunted thereacross for nullifying voltage division therein due to said impedance effects, an electron discharge device having a grid for controlling the current flow through the main discharge path thereof, a grid circuit operatively connected to the voltage divider network for applying a voltage to said grid proportional to the difference in the resistance values of the known resistance and apparatus, a control circuit including said main discharge path and a relay in series therewith for operating or releasing the relay selectively in accordance with an increase or decrease in said grid voltage from a predetermined bias voltage applied to the grid, means including an element adjustable at will for deriving said predetermined bias voltage from said circuit means, and a circuit including a lamp and adapted to be controlled by said relay for lighting or extinguishing the lamp selectively as the relay operates or releases, said predetermined bias voltage either being slightly less than or in excess of a bias voltage corresponding to the minimum operating current of the relay whereby the relay may be caused to operate to light the lamp when the resistance value of the apparatus is lesser by a predetermined amount than the value desired therefor or selectively the relay may be caused to release to extinguish the lamp when the resistance value of the apparatus exceeds the value desired therefor by a predetermined amount.

8. A resistance testing device of the character disclosed comprising, in combination, a known resistance having a value corresponding to the resistance value desired for the apparatus to be tested, circuit means adapted to be energized from a conventional A. C. source for connecting said known resistance and said apparatus in series to form a voltage divider network, an electron discharge device having a rectifying path and an amplifying path including a screen grid and a control grid for controlling the current flow therethrough, a second circuit means responsive to the A. C. voltage developed across the apparatus and including said rectifying path for generating and applying to said grid a voltage proportional to the difference in the resistance values of the known resistance and apparatus, a control circuit including said amplifying path and a relay in series therewith for operating or releasing the relay selectively in accordance with a predetermined increase or decrease in the current flow therethrough from a predetermined current value controlled by the potential on said screen grid, means including an element adjustable at will for deriving said screen grid potential from said first named circuit means, and an indicating circuit including a lamp and adapted to be controlled by said relay for lighting the lamp as the relay operates or selectively for extinguishing the lamp as the relay releases, said predetermined current value either being slightly less than or in excess of the minimum operating current of the relay whereby the relay may be caused to operate to light the lamp when the resistance value of the apparatus is less than the value desired therefor by a predetermined amount corresponding to said predetermined increase in the relay current or selectively the relay may be caused to release to extinguish the lamp when the resistance value of the apparatus is greater than the value desired therefor by a predetermined amount corresponding to said predetermined decrease in the relay current.

9. A resistance testing device of the character disclosed comprising, in combination, a lamp, a relay, a circuit including said lamp and controlled by the relay for lighting the lamp when the relay is energized by a D. C. current which equals or exceeds the minimum operating current thereof, a rectifier, a known resistance having a value corresponding to the resistance value desired for the unknown resistance to be tested, circuit means operable from an A. C. source and including said rectifier and said known and unknown resistances in series for generating and applying a D. C. current to the relay having a value proportional to the difference in the peak values of the A. C. voltages across said resistances, and variable resistance means adjustable at will and included in said circuit means for initially adjusting the relay current to a predetermined value whereby the luminous condition of the lamp is changed when said difference in resistance values exceeds a predetermined value and the relay current changes from said predetermined value and in the direction of said minimum operating current.

EUGENE H. BEACH.
MAX T. WEISS.

REFERENCES CITED

The following references are of record in the file of this patent:

UNITED STATES PATENTS

| Number | Name | Date |
|---|---|---|
| 1,915,028 | Meyer-Jacenberg | June 20, 1933 |
| 1,919,538 | Stone | July 25, 1933 |
| 1,966,185 | Preisman | July 10, 1934 |
| 2,033,465 | Graham | Mar. 10, 1936 |
| 2,189,462 | Donle | Feb. 6, 1940 |
| 2,304,513 | Stearns | Dec. 8, 1942 |
| 2,358,433 | Wolfner | Sept. 19, 1944 |
| 2,377,363 | Noble et al. | June 4, 1945 |